No. 852,610. PATENTED MAY 7, 1907.
T. J. F. MUELLER.
CAR FENDER.
APPLICATION FILED MAR. 9, 1907.

2 SHEETS—SHEET 1.

Inventor
Theodore J. F. Mueller

Witnesses

By

Attorney

No. 852,610. PATENTED MAY 7, 1907.
T. J. F. MUELLER.
CAR FENDER.
APPLICATION FILED MAR. 9, 1907.

2 SHEETS—SHEET 2.

UNITED STATES PATENT OFFICE.

THEODORE J. F. MUELLER, OF PORTLAND, OREGON.

CAR-FENDER.

No. 852,610.      Specification of Letters Patent.      Patented May 7, 1907.

Application filed March 9, 1907. Serial No. 361,499.

*To all whom it may concern:*

Be it known that I, THEODORE J. F. MUELLER, a citizen of the United States, residing at University Park, Portland, in the county of Multnomah and State of Oregon, have invented certain new and useful Improvements in Car-Fenders, of which the following is a specification.

The present invention comprises certain new and useful improvements in car fenders, and one of the principal objects of the invention is to provide a fender that can be readily attached to, or detached from, the truck of the car.

Another object is to provide a fender of the type known as the "folding hinged scoop" fender, the scoop or front portion being so connected with the supporting members thereof that when an object or obstruction is met, the scoop will automatically dip down and pick up the object or obstruction.

Another object is to provide means whereby the "dipping" movement of the scoop may be limited.

Another object is to provide an arrangement of fender supporting frames which are capable of being slid one within the other so that when the fender is not in use, it may be folded upon itself within its supporting frame, and the supporting frame slid back within a main frame that is carried by the car truck.

Another object is to provide an arrangement of support for the back of the fender; the said support being carried by the main frame and the means which hold the said support being such that it can be readily detached from the said main frame when desired, such for example, as when it is desired to fold the fender, the back support serving in such case as an effective means for retaining the fender in its closed position.

With these and other objects in view, the invention consists of certain features of construction and combination of parts illustrated in the accompanying sheets of drawings; described in detail in the annexed specification, and pointed out in the appended claims.

Figure 1:
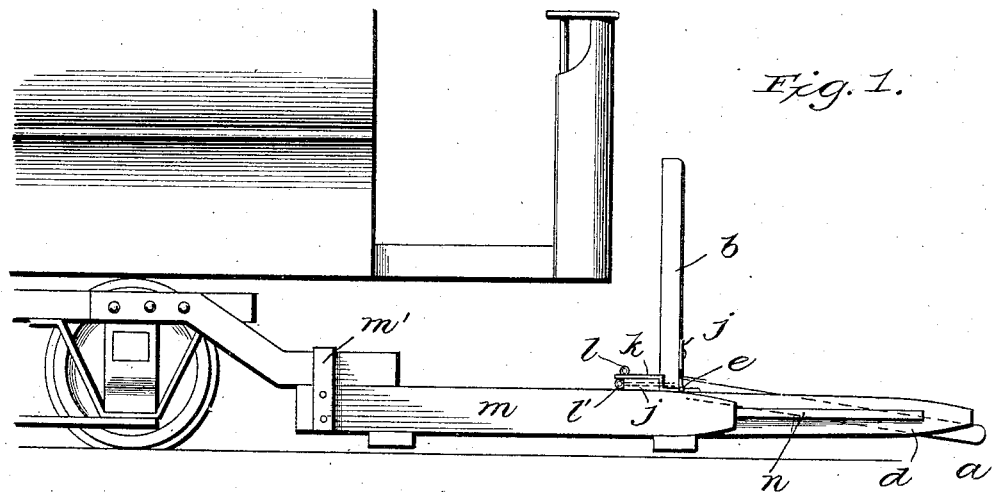
Figure 2:
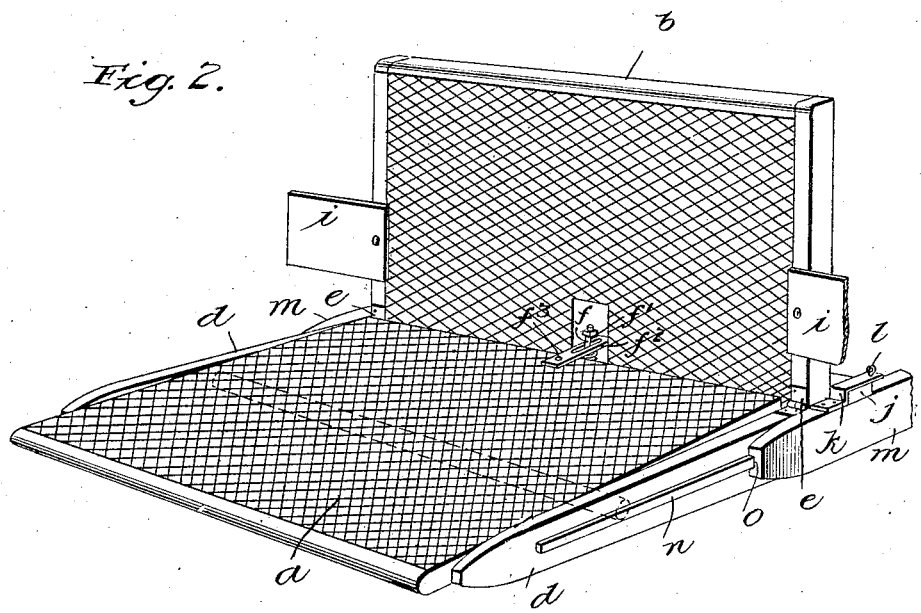
Figure 3:
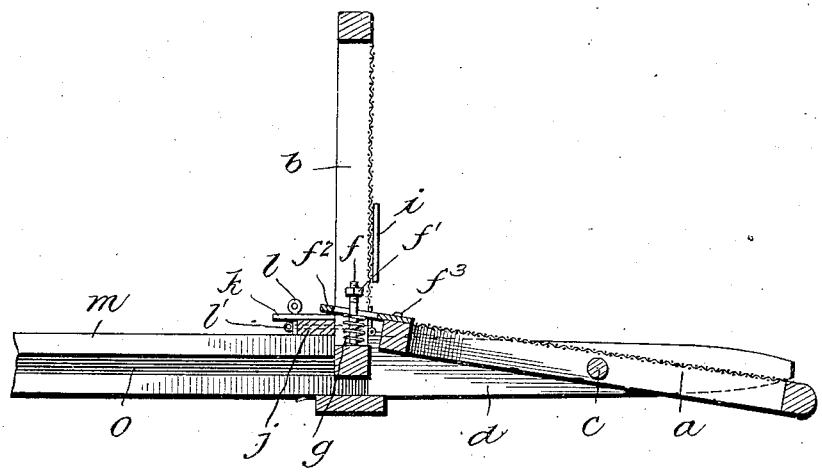
Figure 4:
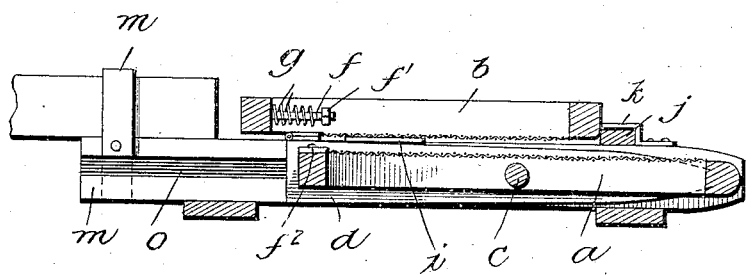

Of the accompanying drawings—Figure 1 is a side elevation, showing the fender attached to a car and in its operative position. Fig. 2 is a perspective view of the fender. Fig. 3 is a longitudinal sectional view of the fender, the same being shown in its operative position. Fig. 4 is a similar view, the fender being shown in its folded position.

Similar characters of reference refer to corresponding parts throughout the specification and in the several figures of the drawings.

In the accompanying drawings, wherein I have illustrated one form of my invention, $a$ designates the horizontally arranged front or scoop portion of the fender and $b$ designates the vertically arranged back thereof. Each of these portions $a$ and $b$ are of the usual rectangular-shaped frames, the sides and ends of which may either be of metal or wood, and each of the frames is covered with the usual wire netting or other resilient material. The exposed, or contacting, edges of both of these portions $a$ and $b$ are covered with the usual cushioning material, such as felt, rubber, or the like.

$d, d$, designate the two side supports which are of relatively heavy material, and are sufficiently spaced apart to provide for placing therebetween the scoop portion $a$.

$c$ designates a bar that extends laterally across the center of the frame of the scoop portion, the ends passing through the sides of the frame and being journaled within the side bars $d, d$. This bar $c$ is arranged, of course, below the wire netting and forms the means upon which the scoop rocks or "dips."

The vertically arranged back portion of the fender is located immediately in the rear of the scoop $a$ and is connected to the side bars $d, d$ by means of the hinges $e, e$. Through the bottom of the frame of the back portion $b$, a bolt $f$ extends upward. This bolt is centrally located in said frame and is threaded for the reception of a nut $f'$. The rear of the frame of the scoop $a$ has pivoted thereon a slotted bail or bar $f^2$, that is so located that it extends through a slot in the netting of the back portion $b$, and is normally in position to be placed over the bolt $f$.

$g$ designates a strong spiral spring that is coiled around the bolt $f$, the upper end of which bears against the under side of the bail or bar $f^2$ when the bail or bar is in position upon the bolt $f$.

The main frame of the fender consists of two side bars $m, m$, which are connected together in a spaced apart position by any suitable means—as for example by front and back timbers connected to their under sides. These side bars $m, m$ are connected to the side beams of the bar truck by means of suitable straps $m'$, or the like, as shown in Fig. 1 of the drawings. The interior faces of these side bars are each provided with a groove $o$. The exterior of the faces of the scoop supporting bars $d, d$, are each provided with a feather $n, n$, which corresponds with the grooves $o, o$, and together these feathers and grooves provide the means by which the fender may be slid back within the main frame.

$j$ designates a crosspiece that extends across the main frame, at the top, immediately in the rear of the back portion $b$ of the fender. The ends of this crosspiece are held upon the top of the side pieces $m, m$, by means of the angle irons $k, k$ and eye bolts $l, l$. This crosspiece is also connected to the sides of the frame of the back portion $b$ of the fender by means of the eye bolts $l', l'$. The object of this crosspiece is, in addition to providing a back-supporting means for the back of the fender, to prevent the supporting bars being drawn away from the main frame, when the fender is in its open, or operative position, and to keep the fender closed when it is in its closed position.

$i, i$, designate side protectors which are pivoted to the ends of the back portion $b$. These protectors are so located adjacent the lower portion of the fender that they will extend outward a distance sufficient to be in a position to deflect an object or obstruction away from the wheels of the car should it fall out of the fender.

From the foregoing description it is thought the operation and utility of the invention will be apparent. It will be noted that the arrangement of the scoop portion within its supporting members permits of the necessary dip thereof in order to pick up the object on the track, and the relative arrangement of the bail or bar and the bolt and spring regulates the degree of such dip—the nut on the bolt limiting the upward movement of the rear of the scoop, and the spring tending to limit its downward movement. When it is not desired to use the fender, the crosspiece $j$ is unbolted from the side bars $m, m$, and the back portion $b$. The front of the scoop portion of the fender is then tilted downward, thereby raising the rear portion and with it the pivoted bail on bar of the bolt $f$, until the said bail or bar is in a position to be removed from the bolt. The bail or bar is then turned around on its pivot until it is within the scoop portion of the fender. The side deflectors are then likewise turned upon their pivots in onto the back portion of the fender. The back portion may then be folded down upon the scoop portion $a$, and as these two portions $a$ and $b$ are carried by the side supports $d, d$, the whole may be then slid back within the main frame $m, m$. After this has been done, the back support is replaced within the angle irons, thus providing a means for retaining the fender in its closed position. A reversal of the operation just described will place the fender in position for use.

It will be understood that all parts are so connected by means of bolts that they may be readily disconnected.

While I have described and claimed the invention as a car fender, I wish it to be understood that the invention is not limited to use in connection with cars, it being obvious that it may be used in connection with vehicles generally.

I claim as my invention:—

1. In a car fender, a main frame detachably connected with the car; supporting bars slidingly mounted in said main frame; a scoop portion mounted to have a rocking movement within said supporting bars; a back portion hinged to said supporting bars, and means carried by the scoop portion and the back portion adapted to limit the rocking movement of the said scoop.

2. In a car fender, a main frame detachably connected with the car; supporting bars slidingly mounted in said main frame; a scoop portion mounted to have a rocking movement within said bars; a back portion hinged to said sliding bars and being so located that it may be folded down upon the said scoop portion, and means carried by the said scoop portion and the said back portion whereby the rocking movement of the said scoop may be limited.

3. In a fender, a main frame detachably connected with the vehicle; supporting bars slidingly mounted in said main frame; a scoop portion pivotally mounted within said supporting bars; a back portion hinged to said supporting bars and being so located whereby it may be folded down upon the said scoop; means carried by said back portion for limiting the sliding movement of the bars, and means carried by the said back portion and the scoop portion for limiting the pivotal movement of the said scoop portion.

4. A car fender comprising a main frame detachably connected with the car; supporting bars slidingly mounted in said main frame; a scoop portion: a bar extending across said scoop portion, the ends of said bar extending through the sides of said scoop portion and being journaled within the supporting bars to provide means upon which said scoop portion may be rocked; a vertically arranged back portion the lower edge of which is hinged to the supporting bars adjacent to the rear end of said scoop portion; wings or deflectors carried by said back portion adapted to deflect an object away from the car wheels, and co-operating means carried by the scoop portion and the back portion for limiting the rocking movement of the said scoop portion.

5. A car fender comprising a main frame connected with the car; supporting bars slidingly mounted within said main frame; a scoop portion mounted to have a rocking movement within the supporting bars; a back portion hinged to said supporting bars; side wings or deflectors pivoted to said back portion, and co-operating means carried by the scoop portion and the back portion for limiting the rocking movement of the said scoop portion.

6. A car fender comprising a main frame the inner faces of the sides of which are each longitudinally grooved; supporting bars the outer faces of which are each provided with a longitudinal feather corresponding with the grooves of the main frame; a scoop portion mounted to have a rocking movement within the said supporting bars; a back portion hinged to said supporting bars; side deflectors pivoted to said back portion; means for normally retaining said back portion in a vertical position; a slotted bar pivoted to the scoop portion and extending through the meshes of the back portion; a vertically arranged bolt carried by the back portion and located so as to be in position to be passed through the slotted bar of the scoop portion; a spring coiled upon said bolt, and a nut for the said bolt.

7. A folding car fender comprising a main frame detachably connected with the car; supporting bars slidingly mounted within the said main frame; a scoop portion mounted to have a rocking movement within said supporting bars; a back portion hinged to the supporting bars adjacent to the rear of the scoop portion; side deflectors pivoted to said back portion; co-operating means carried by the scoop portion and the back portion for limiting the rocking movement of the scoop portion, and means carried by the main frame for normally retaining the back portion in a vertical position, said means also serving to retain the parts of the fender in their folded position after they have been folded and slid back within the main frame.

8. A folding fender comprising a main frame; supporting bars capable of being moved forwardly and rearwardly within said main frame; a scoop portion mounted to have a rocking movement within said supporting bars; a back portion hinged to said supporting bars adjacent to the rear of said scoop portion; side deflectors pivoted to said back portion; co-operating means carried by the scoop portion and the back portion for limiting the rocking movement of said scoop portion, and detachable means carried by the main frame adapted to normally hold the said back portion in a vertical position and also serving to retain the parts in position when they are folded and slid back within the main frame.

In testimony whereof I have affixed my signature, in presence of two witnesses.

THEODORE J. F. MUELLER.

Witnesses:
J. F. WILSON,
J. V. TAMIESIE.